July 28, 1964   H. E. SPOONER   3,142,175
APPARATUS FOR SHEAR TESTING JOINTS
Filed Jan. 5, 1961   3 Sheets-Sheet 1
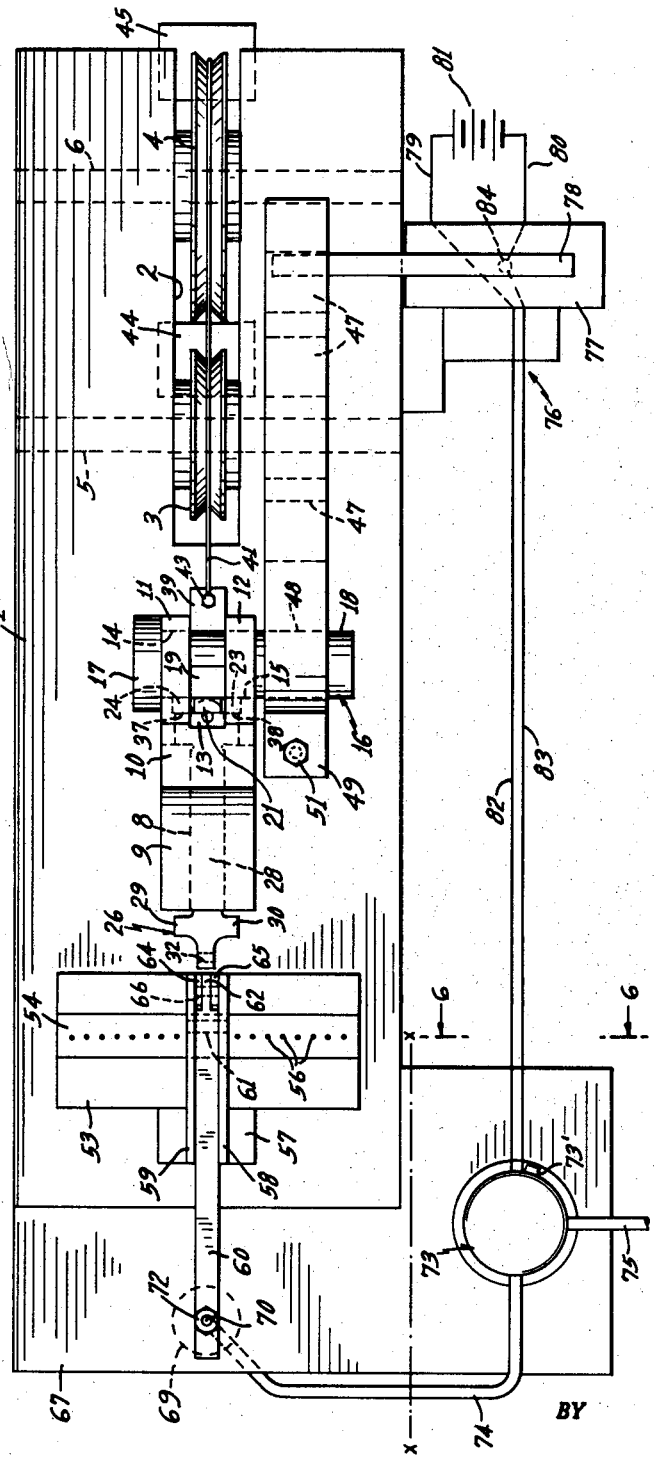
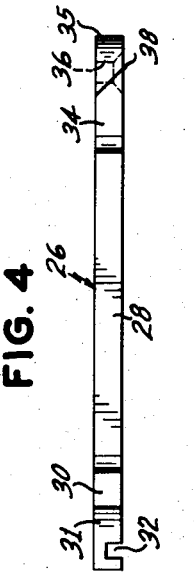
FIG. 4
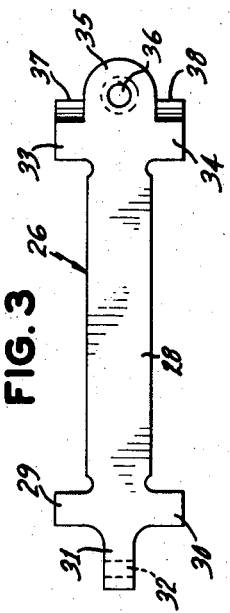
FIG. 3
INVENTOR.
HOWARD E. SPOONER
BY
ATTORNEYS
AGENT July 28, 1964  H. E. SPOONER  3,142,175
APPARATUS FOR SHEAR TESTING JOINTS
Filed Jan. 5, 1961  3 Sheets-Sheet 2
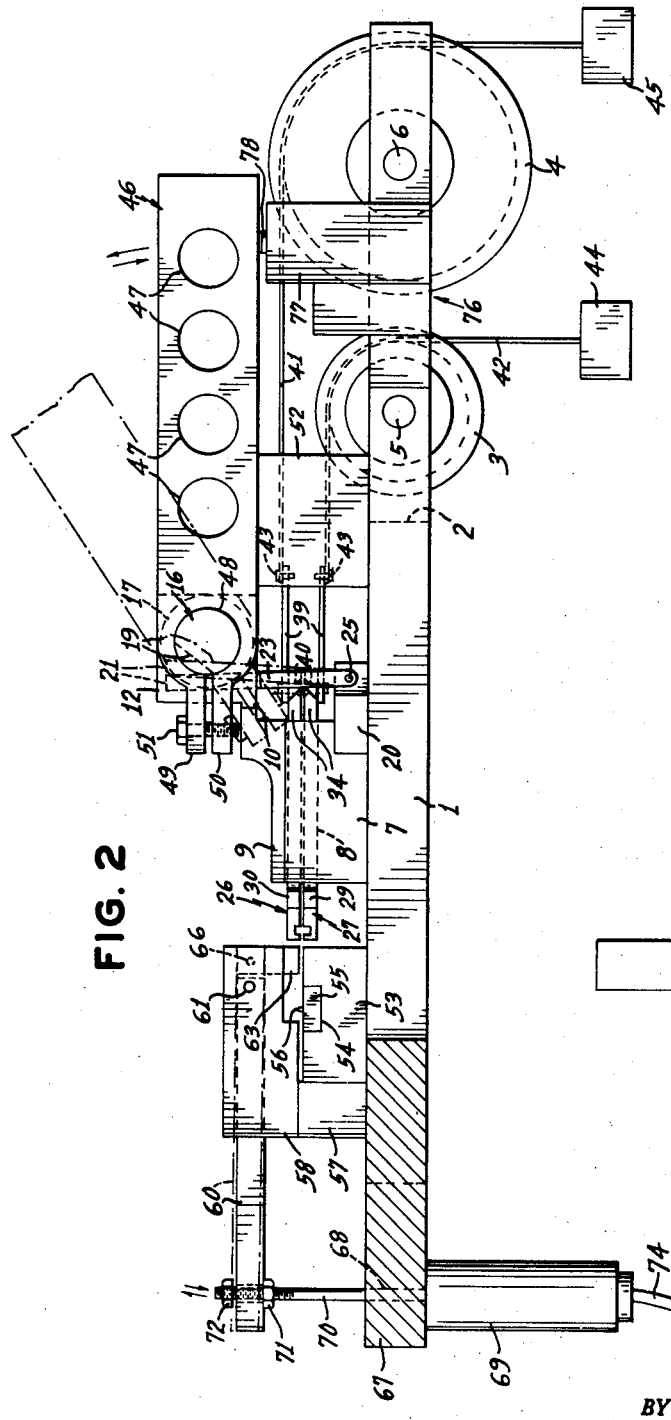
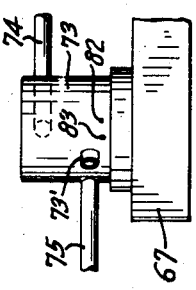
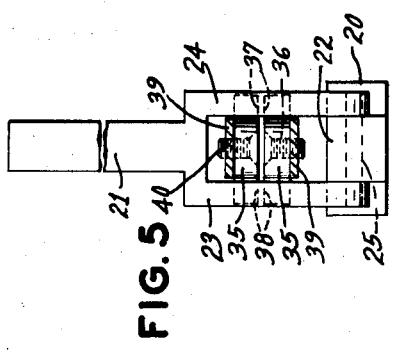
INVENTOR.
HOWARD E. SPOONER
BY
ATTORNEYS
AGENT July 28, 1964 H. E. SPOONER 3,142,175
APPARATUS FOR SHEAR TESTING JOINTS
Filed Jan. 5, 1961 3 Sheets-Sheet 3
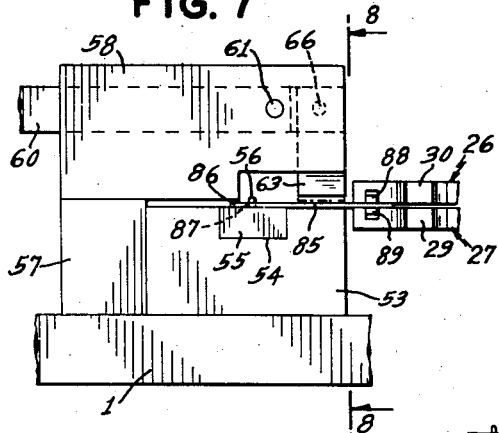
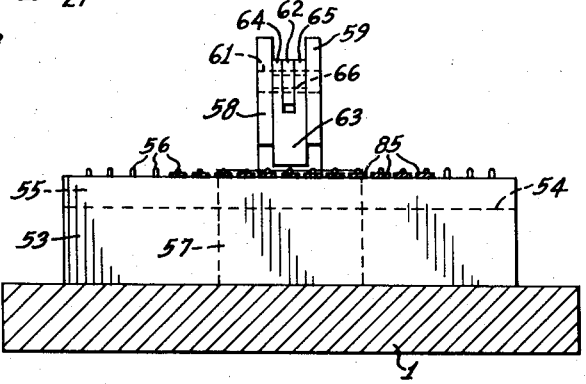
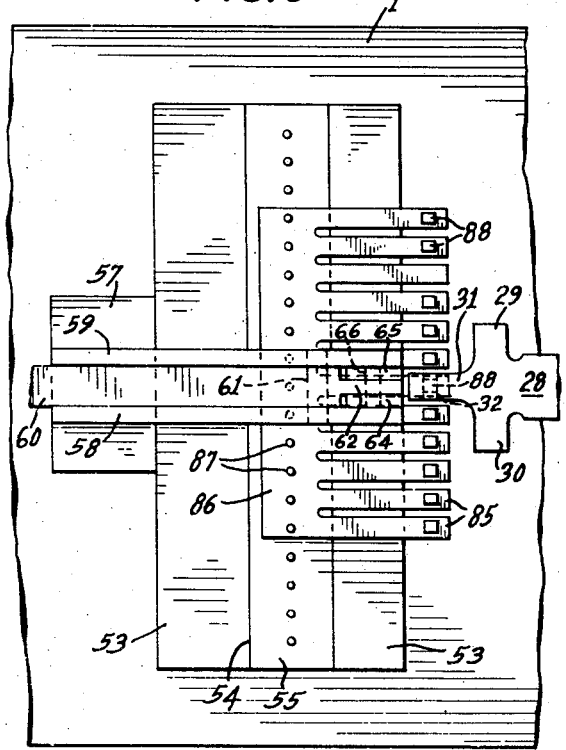
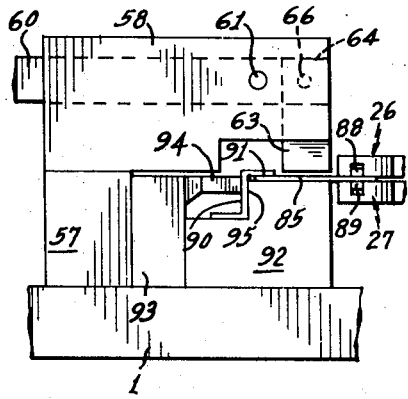
INVENTOR.
HOWARD E. SPOONER
BY
ATTORNEYS
AGENT

United States Patent Office 3,142,175
Patented July 28, 1964

3,142,175
APPARATUS FOR SHEAR TESTING JOINTS
Howard E. Spooner, Lincoln, R.I., assignor to Engelhard Industries, Inc., Newark, N.J., a corporation of Delaware
Filed Jan. 5, 1961, Ser. No. 80,892
3 Claims. (Cl. 73—101)

The present invention deals with apparatus for shear testing joints and more particularly with apparatus for shear testing the bond between joined members.

In the manufacture of welded electrical contact miniature relay assemblies, it has long been desired to provide a means of shear testing the welded contacts without destroying them by marring or deforming the contacts. When the contacts are marred or deformed, they do not operate properly and are unusable. The most common shear testing method has been to use a fixture which would give a load reading of the force required to shear the contacts from the contact arm to which the contacts are welded. By selecting at random a percentage of the lot to be tested and finding that all the contacts tested sheared at a shearing force greater than specified as satisfactory, it was assumed that the remaining lot was satisfactorily welded. Experience has shown that a percentage of incomplete or weak welds may still exist in the remaining lot of electrical contacts.

The present invention contemplates the testing of every contact in a lot of contacts to assure that all contacts meet a prescribed minimum shear test and yet not destroying those contacts which meet the shear strength specified during the shear testing thereof. The apparatus, according to the invention, for testing the contacts comprises a means for restraining or securing a contact arm against undesirable movement, at least one and preferably a pair of jaws adapted to engage a contact or a pair of contacts mounted, e.g. welded, on a contact arm, guide means for said jaw or jaws, the jaw or jaws being longitudinally movable relative to the guide means, and means connected to the jaw or jaws for applying a predetermined shearing force to the contacts while the contact arm is secured against undesirable movement during the application of the shearing force. When a pair of jaws are employed to simultaneously test a pair of contacts, the jaws of the apparatus are preferably coextensively mounted adjacent each other in a guide means, they are longitudinally movable relative to the guide means as well as independently longitudinally movable relative to each other, and independent means for applying a predetermined shearing force is connected to each jaw.

It is an object of the invention to provide an apparatus for shear testing joints.

It is another object of the invention to provide an apparatus for shear testing the bond between joined members.

It is a further object of the invention to provide an apparatus for shear testing electrical contacts mounted on a contact arm without destroying the tested contacts.

It is a still further object of the invention to provide an apparatus for simultaneously shear testing a plurality of electrical contacts mounted on a contact arm.

Other objects and advantages of the invention will become apparent from the description hereinafter following and the drawings forming a part hereof, in which:

FIGURE 1 illustrates a top view of an apparatus according to the invention,

FIGURE 2 illustrates a side view of the apparatus of FIGURE 1 with a portion thereof along lines $x—x$ of FIGURE 1 omitted, FIGURE 3 illustrates a top view of an embodiment of the apparatus, FIGURE 4 illustrates a side view of FIGURE 3, FIGURE 5 illustrates a front view of another embodiment of the apparatus, FIGURE 6 illustrates a partly elevational and partly cross-sectional view along lines 6—6 of FIGURE 1, FIGURE 7 illustrates an enlarged fragmentary side view of certain components of the apparatus including one type of workpiece as applied to the apparatus, FIGURE 8 illustrates a front view along lines 8—8 of FIGURE 7, FIGURE 9 illustrates a top view of FIGURE 7, FIGURE 10 illustrates an enlarged fragmentary side view of a modification of the invention adapted to test another type of workpiece, and FIGURE 11 illustrates a top view of a component of FIGURE 10.

In accordance with the invention as particularly illustrated by FIGURES 1 and 2, the apparatus comprises a base plate 1 having a longitudinal slot 2 formed through one end of the base plate and passing substantially centrally along a substantial portion of the length of the plate. A pair of pulleys 3 and 4 are mounted in the slot 2 on shafts 5 and 6 passing through the width of the plate. The pulleys are spaced from each other longitudinally of the slot 2 with one pulley being of larger diameter than the other. A guide block 7 having a guide groove 8 extending throughout the length thereof is mounted on plate 1 forwardly of the slot with the longitudinal axis of the groove corresponding with the longitudinal axis of the slot 2. The bottom of the groove 8 is elevated with respect to the base plate 1. A cover plate 9 is mounted on block 7 and covers the groove 8. An arm 10 extends from one end of the cover plate 9 in the direction of slot 2. The free end of arm 10 is formed into a pair of upwardly directed and laterally spaced bearing lugs 11 and 12 having a space 13 therebetween and coaxial journal bores 14 and 15 formed through each lug, the axis of the journal bores being normal to the axis of the groove 8. A journal shaft 16 having a head 17 and shank 18 is mounted through the bearing lugs 11 and 12 with the head 17 positioned in abutment with one of the lugs 11 and the end of shank 18 passing through and extending outwardly of the other lug. A short longitudinal portion of the surface of shank 18 intermediate the ends thereof is cutaway and forms a cam means or cam section 19 which is positioned in and across the space 13 between lugs 11 and 12. A pivot block 20 is mounted on base plate 1 adjacent the guide block 7 and between the guide block and slot 2. A lever 21 having an end thereof pivoted on pivot block 20 passes upwardly into the space 13 in engagement with the cam section 19.

FIGURE 5 particularly illustrates the pivot block and lever. The pivot block has a narrow leg 22 extending therefrom. The lever 21 comprises a rod with one end divided into a pair of laterally spaced legs 23 and 24 and resembles a tuning fork. The legs 23 and 24 straddle the pivot block leg 22 and a shaft 25 passes through the leg 22 and through end portions of both lever legs 23 and 24 whereby the ends of the lever legs are pivoted on the leg 22.

Prior to mounting the cover plate 9 on block 7, a pair of elongated flat mated jaws 26 and 27, with one superposed on the other, are positioned in the groove 8 of block 7. The jaws are identical in structure and one of the jaws is particularly illustrated by FIGURES 3 and 4. The jaw comprises an elongated straight flat body portion 28 of rectangular cross-section having a pair of aligned abutment ears 29 and 30 extending laterally outward of the sides of the body portion near one end thereof. A short nose 31, narrower than the portion 28, extends axially of the body 28 and forwardly of the ears 29 and 30. A contact groove 32 is formed in one surface of the nose 31 transversely and near one end thereof. A second pair of aligned abutment ears 33 and 34 extend laterally outward of the sides of the body portion near the other end of the body. A short stud 35 extends axially of the body 28 and rearwardly of the ears 33 and 34. The stud 35 provided with a bore 36 through the thickness thereof. The rear edges of the ears 33 and 34 are bevelled from one surface of the ears to the other surface to provide sharp edges 37 and 38. In mounting the jaws 26 and 27 in the groove 8, they are superposed one on the other with the transverse grooves aligned with and facing each other and the sharp edges 37 and 38 adjacent each other as illustrated in FIGURE 2. Having positioned the jaws in the groove 8, the cover plate 9 is mounted thereover. The body portion 28 of each jaw is longer than the groove 8 and the jaws are independently longitudinally slidable within the groove 8, the sliding movement being limited and contained by means of the abutment ears on both sides of block 7.

Prior to or after having mounted the jaws in groove 8, each jaw is provided with a tongue 39 having one end secured to the jaw by securing means 40, e.g. a screw. The tongues are positioned one above the other and each extend axially and longitudinally outward of the jaws.

Flexible cables 41 and 42 are secured one to each tongue 39 by securing means 43, e.g. a screw or bolt. The cables 41 and 42 pass, respectively, over pulleys 4 and 3 and downwardly therefrom. Preselected weights 44 and 45 are secured to the ends of the cables.

A handle 46 of balanced weight, the weight being balanced by forming weight balancing holes 47 therethrough, is mounted on shank 18 of shaft 16. The handle, as illustrated, is a rectangular bar having a clamp bore 48 formed therethrough at one end portion of the handle. The clamp bore is of slightly larger diameter than the shank 18. The handle terminates in a pair of ears 49 and 50 formed by a slot therebetween which communicates with the clamp bore. In mounting, the shank 18 is passed through the clamp bore 48, the shank is turned slightly until the cam section 19 is at a predetermined position, and the arm is clamped onto the shaft by a clamping means 51, e.g. a bolt, passing through the ears 49 and 50. Preferably, the secured handle is normally positioned horizontally and rests on rest block 52 mounted on base plate 1 and having a height sufficient to permit the handle to rest thereon in horizontal position.

An anvil member 53 is mounted on base plate 1 and spaced from the aligned noses 31 of each of the jaws along the longitudinal axes of the jaws.

As illustrated by FIGURES 1, 2, 7, 8 and 9, the anvil is of substantially rectangular cross-section and is provided with an anvil groove 54 in the upper surface of the anvil and normal to the longitudinal axis of the jaws. A guide strip 55, having bosses 56 on the upper surface thereof and spaced from each other longitudinally of the strip, is positioned in the anvil groove 54. A workpiece holding device is mounted on plate 1 in operative association with the anvil. The holding device comprises a holder block 57 positioned on base plate 1 adjacent and in abutment with the anvil, the anvil being positioned between the holder block and the jaws 26 and 27. A pair of laterally spaced parallel holder arms 58 and 59 are mounted on the holder block and extend outwardly therefrom above the anvil and toward the jaws 26 and 27. The free ends of the arms 58 and 59 traverse the full width of the anvil. A lever 60 is rotatably mounted between the arms 58 and 59 by means of a shaft 61 passing transversely through the lever and the arms. The end of the lever 60 is provided with a reduced end 62, which terminates coextensively with the free ends of the arms 58 and 59. A U-shaped head 63 having legs 64 and 65 is rotatably mounted on the reduced end 62 by means of a shaft 66 passing through the legs 64 and 65 and reduced end 62. The base of the U-shaped head extends below the arms 58 and 59 toward the anvil and contacts a workpiece on the anvil in a manner hereinafter more particularly described.

While the holding device may be operated manually, it is preferably operated automatically, and therefore, auxiliary operating means are provided, which comprises an L-shaped auxiliary base plate 67 which engages an end of the base plate 1 beneath the lever 60, which extends beyond base plate 1 and over the auxiliary plate 67. A bore 68 is formed through the plate 67. A pneumatic jack 69 is mounted on the undersurface of plate 67 beneath the bore 68. A piston rod member 70 extends upwardly from the jack 69 through the bore 68 and is connected to the free end of lever 60. Preferably, the piston rod passes through the end of lever 60 and is secured thereto by bolts 71 and 72 threadedly mounted on the rod 70 and contacting both sides of the lever 60. An electrically operated valve 73, e.g. a solenoid valve as illustrated by FIGURES 1 and 6, is mounted on the upper surface of plate 67 and spaced laterally of the lever 60. A conduit 74 communicates between the valve 73 and jack 69 as illustrated. A second conduit 75 leads from the valve to a source of pressurized air. An exhaust conduit 73' is provided for valve 73.

A bracket member 76 is mounted on the side of base plate 1 spaced from the plate 67 longitudinally of the base plate 1 and laterally of a free end portion of handle 46. A microswitch operating means is contained in a housing 77 which is mounted to the side of bracket 76. A microswitch blade 78 is mounted on top of housing 77 and is operatively associated with the microswitch operating means. The blade 78 extends from the housing 77 toward the handle 46 and its end portion is positioned beneath the free end portion of the handle. The blade 78 contacts the handle 46 when the handle is in a horizontal position and resting on rest block 52.

Electrical leads 79 and 80 are connected to the microswitch means in housing 77 and to a source of electrical energy 81. Electrical leads 82 and 83 are connected to the microswitch operating means in housing 77 and to the valve 73. When the blade 78 is depressed by handle 46, the circuit including the leads and contact point 84 is opened and the valve 73 is de-energized. When the handle 46 is lifted, the circuit is closed and valve 73 is energized. This type of circuitry per se is well-known.

FIGURES 7, 8 and 9 illustrate one type of workpiece or one type of electrical contact strip to which the apparatus of the invention is applicable. For example, the strip is a thin strip blanked through a longitudinal edge and partly across the width of the strip to provide a plurality of contact arms 85 spaced from each other longitudinally of the strip. The contact arms are connected at one end to a common longitudinal portion 86. The portion 86 is provided with a plurality of perforations 87 spaced from each other longitudinally of the strip. The free end portion of each arm 85 is provided with electrical contact members 88 and 89 on both faces thereof.

Prior to shear testing the electrical contact members 88, the strip is positioned between the head 63 of the holding device and the anvil 53 with the bosses 56 of guide strip 55 engaging the perforations 87 of portion 86 of the contact strip. Also, the free end of one of the contact arms 85 is positioned between the noses 31 of jaws 26 and 27 with contacts 88 and 89 positioned in the groove 32.

With the contact strip positioned as described above, the apparatus is ready for operation. In operation, the handle 46 is lifted sufficiently to relieve pressure on the microswitch blade 78, which energizes the valve 73 and opens a port therein to permit pressurized air to pass into jack 69, which moves the piston rod upwardly and thereby simultaneously motivates the lever 60 to depress the head 63 of the holding device into contact with the contact arm 85. Since the strip 85 is anchored by means of bosses 56, the head 63 need not clamp the arm 85 to the anvil 53. However, the head 63 is depressed sufficiently to contain and limit the arm against too great a vertical movement so that the strip is not disengaged from the bosses 56.

Simultaneously with the energization of valve 73, the handle 46 is lifted sufficiently to turn the shaft 16. The shaft 16 is turned to a degree such that the cam section 19 is brought to face the lever 21, whereupon, by cam action, the lever 21 is free to move into engagement with the cam surface 19 and releases pressure on the sharp edges 37 and 38 of jaws 26 and 27. Prior to turning the shaft 16, both jaws are aligned and are held against longitudinal movement relative to groove 8 and to each other by means of the lever legs 23 and 24, which press against the edges 37 and 38 and hold the abutment ears 33 and 34 against the block 7. When the cam action releases pressure on the jaws 26 and 27, the weights 44 and 45 weighing, for example, seven pounds each exert independently shearing forces directly on the contacts 88 and 89 which are positioned in nose grooves 32 of the jaws. Should both contacts be defectively welded or bonded to the contact arm 85 and are unable to withstand the shearing forces, the contacts are sheared from the contact arms and the jaws both move longitudinally relative to the groove 8 and the abutment ears 29 and 30 abut against block 7. Should one contact withstand the shearing force and the other does not withstand the shearing force, then the one contact is sheared and the one jaw associated therewith moves longitudinally relative to the other jaw and its abutment ears 29 and 30 abut against block 7. When both contacts withstand the shearing forms, the jaws remain stationary showing that the contacts are well bonded to the contact arm. FIGURE 9 shows one contact sheared from its contact arm. Having thus shear tested the contacts bonded to one contact arm, the handle 46 is moved back to its original horizontal position on rest block 52 and the handle moves the microswitch blade 78 to de-energize the valve 73 whereupon the air release port 73' is opened and the piston rod 70 moves downward to raise the head 63 of the holding device. Thereafter, the contact strip is advanced on anvil 53 until another contact arm 85 and its contacts 88 and 89 engage the nose slots 32. The shear testing procedure is then repeated. Having tested all contacts on the contact strip, the strip is removed and the arms 85 are cut from the portion 86. The contact arms from which contacts have been sheared are discarded. The tested contacts which are found to be satisfactorily bonded, in view of the structure of the jaws 26 and 27, are not destroyed or marred and all are proven to have a certain minimum shear strength.

FIGURES 10 and 11 illustrate a modification of the invention to provide for the shear testing of another type of contact strip. The other type of contact strip differs from that hereinabove described only in that a bracket 90 is substituted for the portion 86 and the arms 85 are welded to the bracket as at 91 as illustrated in FIGURE 10.

In the modification according to FIGURES 10 and 11, the anvil 53 of FIGURES 1, 2, 7, 8 and 9, is substituted by an L-shaped anvil 92 having a length and height corresponding to that of anvil 53. A hold down block 93 is mounted on base plate 1 between the anvil 92 and block 57. The block 93 is provided with a finger 94 extending from the top thereof toward the side face 95 of the anvil with a spacing therebetween just sufficient to permit the bracket 90 to pass therethrough lengthwise of the anvil. Otherwise, the structure of the apparatus and the operation is identical to that hereinbefore described. However, since the head 63 does not clamp the arm 85 but merely limits its upward movement, the same apparatus is now capable of simultaneously testing three weld joints simultaneously. For example, when a load of seven pounds is applied to contact 88 and an independant load of seven pounds is applied to contact 89, both loads are additive to provide a load of fourteen pounds simultaneously applied to the weld 91 between the bracket 90 and arm 85.

While the apparatus of the invention has been particularly described in connection with the shear testing of electrical contacts, it is also applicable for shear testing other bonded joints.

Various modifications of the invention are contemplated within the scope of the appended claims.

What is claimed is:

1. Apparatus for shear testing bonded test pieces, comprising a base, means for securing a test piece to said anvil member, an anvil member mounted on the base, guide means mounted on the base laterally of the anvil member, a first elongated movable jaw member contacting the guide means and having one end portion thereof adjacent and laterally movable relative to the anvil, means at said one end portion for gripping a portion of the test piece, a first lever member pivotally mounted on the base laterally of the guide means and engageable with the other end portion of the jaw member, shear tension means mounted on the base and connected to the said other end portion of the jaw for urging the jaw laterally outwardly of the anvil, means mounted on the base and in contact with the first lever for locking the first lever in a locking position and thereby maintaining the said one end portion of the jaw in a predetermined position relative to the anvil in opposition to the tension means, a second lever connected to the locking means for locking and releasing the first lever, whereby the test piece gripped by said jaw is subjected to tension by the said shear tension means when the first lever is released, a second elongated movable jaw superposed over said first jaw in contact with the guide means and said first and second jaws being independently longitudinally movable relative to each other, and both jaws having mated end portions adjacent and laterally movable relative to the anvil.

2. Apparatus according to claim 1, comprising independent tension means connected to each jaw.

3. Apparatus for shear testing bonded test pieces, comprising a base, an anvil member mounted on the base, guide means mounted on the base laterally of the anvil member, an elongated movable jaw member contacting the guide means and having one end portion thereof adjacent and laterally movable relative to the anvil, a first lever member pivotally mounted on the base laterally of the guide means and engageable with the other end portion of the jaw member, shear tension means mounted on the base and connected to the other end portion of the jaw for urging the jaw laterally outwardly of the anvil, means mounted on the base and in contact with the first lever for locking the first lever in a locking position and thereby maintaining the one end portion of the jaw in a predetermined position relative to the anvil in opposition to the tension means, and a second lever connected to the locking means for locking and releasing the first lever, whereby the jaw is subjected to tension by the said shear tension means when the first lever is released, and test piece holding means mounted on said base and positioned over the anvil to hold the test piece against dislodgement from said anvil, said test piece holding means comprises a third lever pivotally mounted above the anvil, means on one end of the lever for holding the workpiece, the other end of the lever extending laterally outwardly of the anvil, a fluid operated jack means mounted on said base and connected to said extended lever end, electrically operated valve means mounted on said base, fluid conduit means connecting the jack and valve, switch means mounted on said base and contacting said second lever, electrical leads connecting the valve and switch, electrical leads leading from a source of electrical energy to said switch means, whereby the third lever is activated by said second lever simultaneously with the activation of said locking means.

References Cited in the file of this patent

UNITED STATES PATENTS

| | | |
|---|---|---|
| 2,693,108 | Eckhardt | Nov. 2, 1954 |
| 2,924,969 | Clough et al. | Feb. 16, 1960 |